Patented June 5, 1945

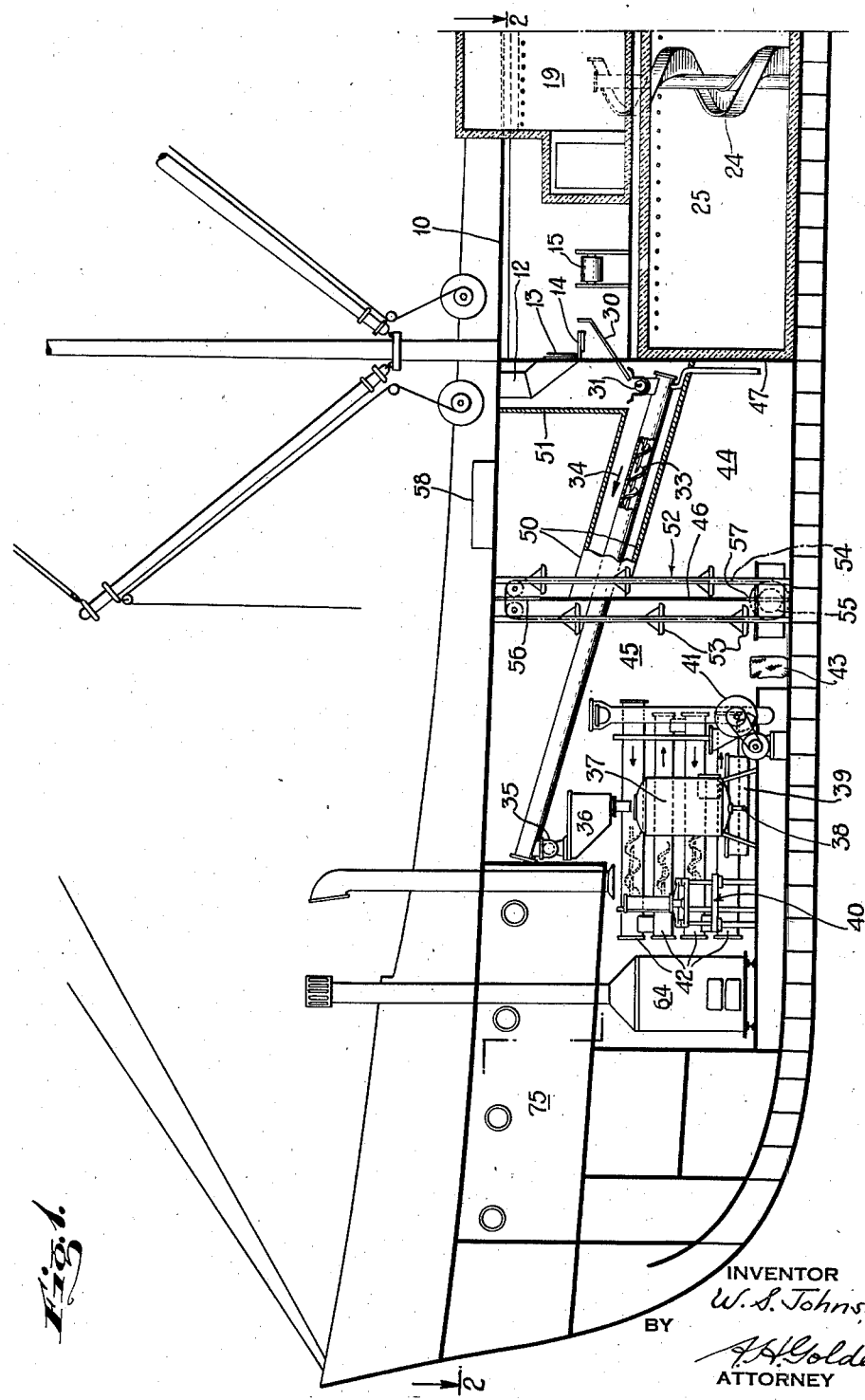

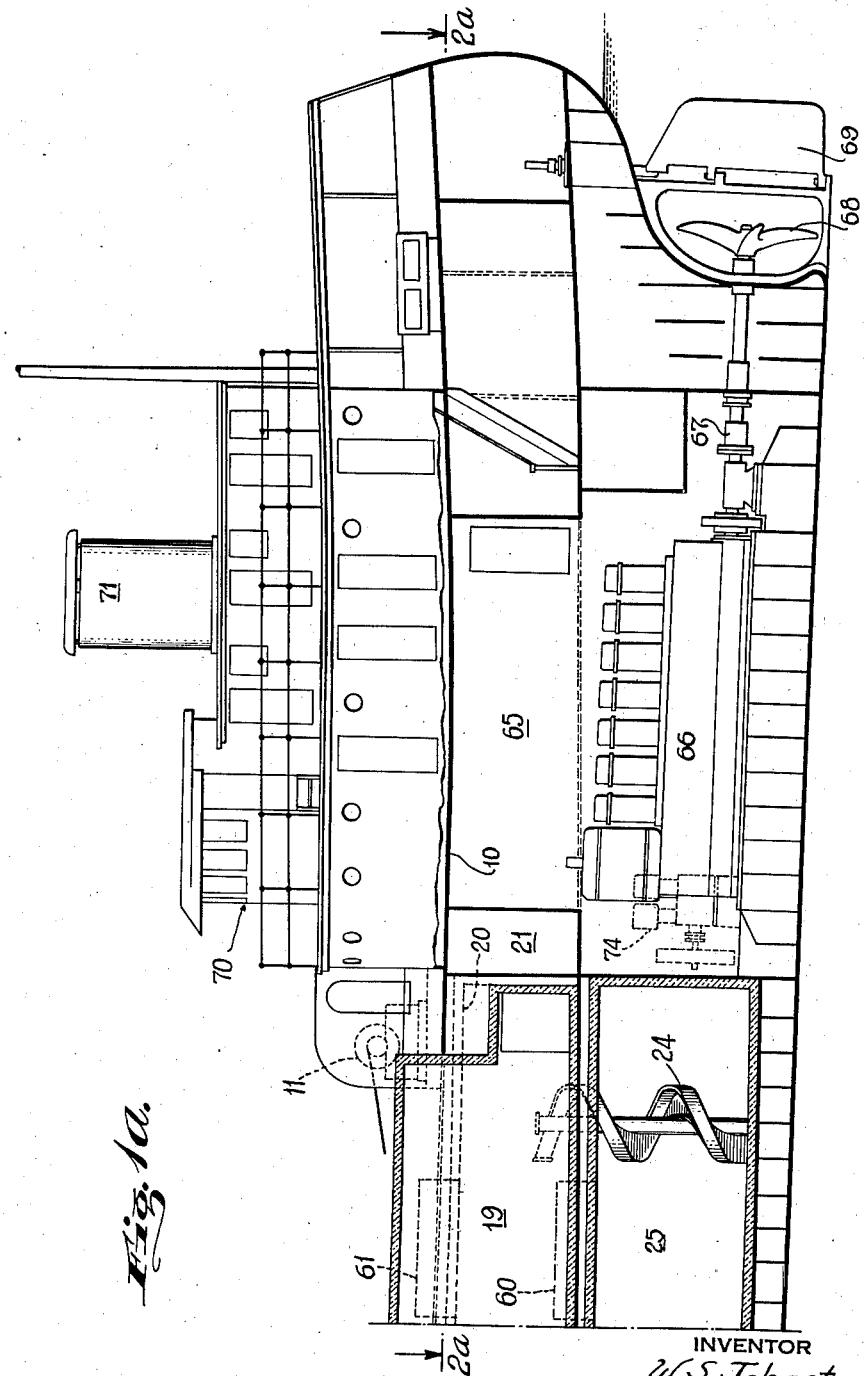

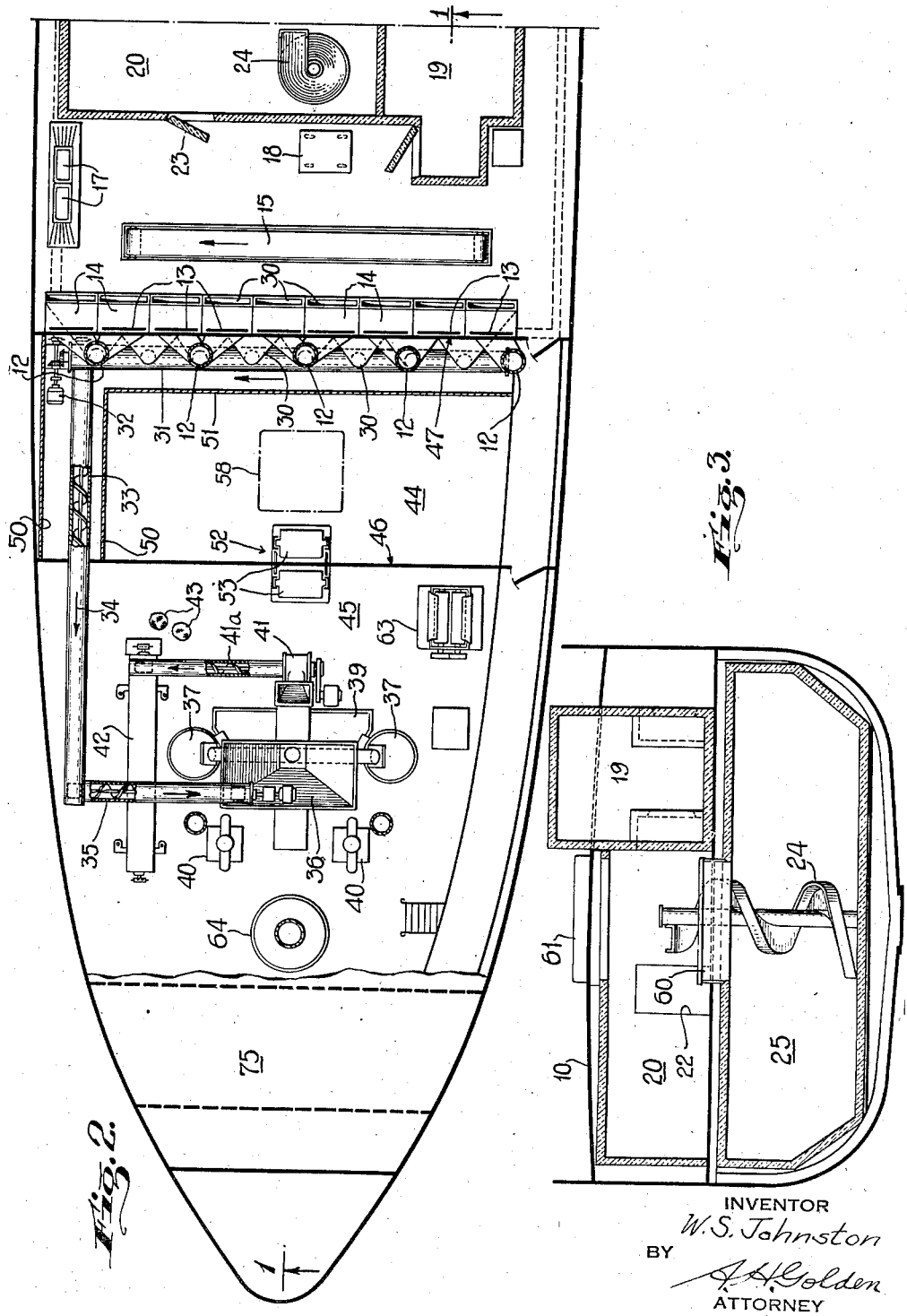

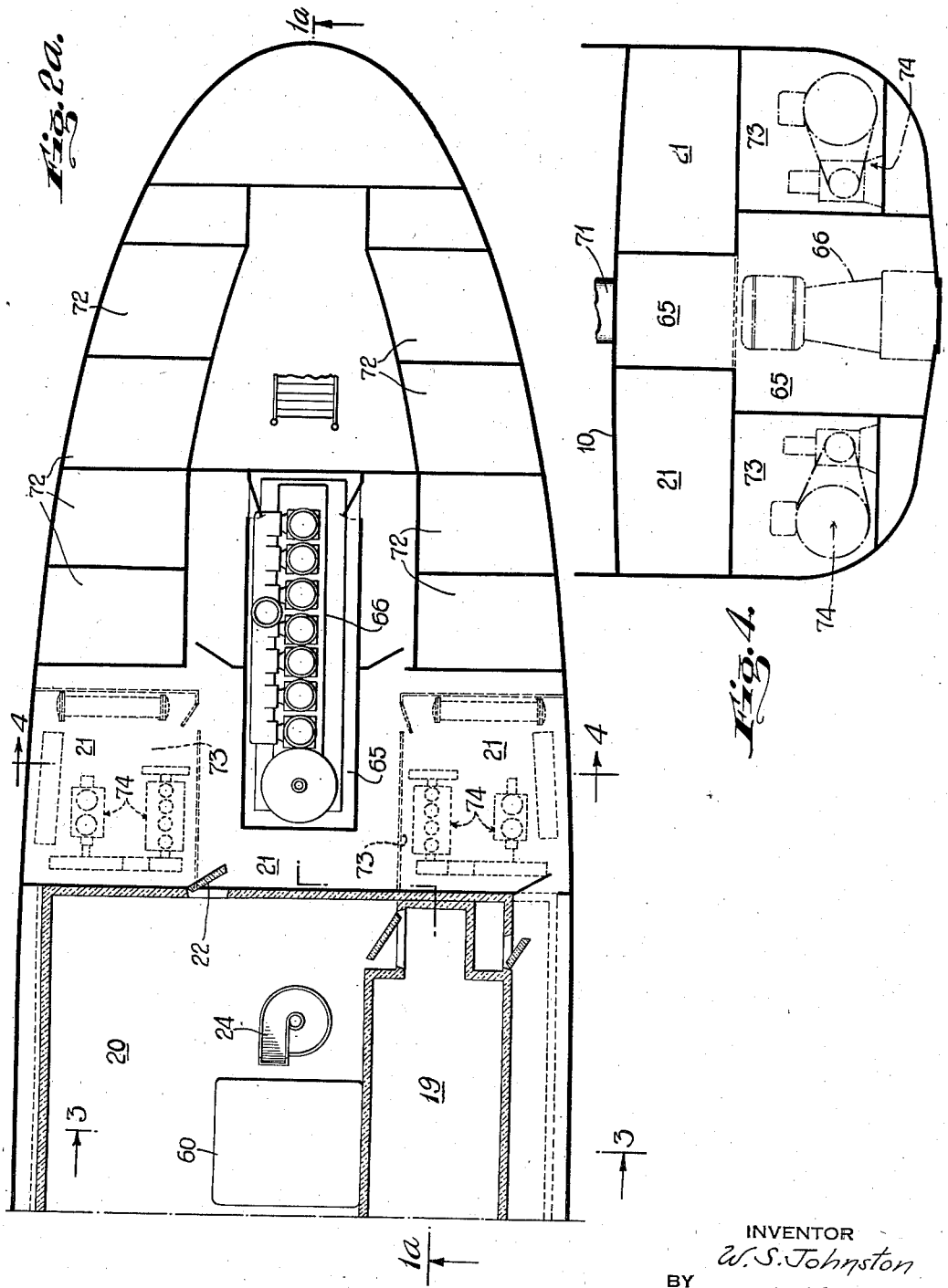

2,377,693

UNITED STATES PATENT OFFICE 2,377,693

FISHING AND FISH PROCESSING SHIP

William S. Johnston, New York, N. Y.

Application May 18, 1944, Serial No. 536,221

8 Claims. (Cl. 114—0.5)

This invention relates to a ship that is adapted for fishing and for the processing of the fish that are caught during the fishing operation.

Ships have been built for fishing and for handling the fish caught, but such ships have never been developed commercially to process fish completely so that they may be available to the consumer when removed from the ship; nor have such ships been utilized for the complete processing of the by-products of fish that are caught during the fishing operation.

In the development of ships to be used for industrial purposes, it has been the general practice merely to place on a ship a particular type of industrial apparatus with the result that there is no relationship between the functioning of the ship as a ship, and the industrial apparatus. It is the object of this invention to contribute to the art a combined fishing and fish processing ship, and with the fish processing machinery and the other facilities utilized therewith, functioning as part of the ship and cooperating in the effective operation of the ship as a ship.

A feature of my invention resides in the particular arrangement of the fish processing machinery relatively to the propulsion machinery of the ship so that the ship will be maintained in balanced relationship, neither down at the bow nor down at the stern. As a further feature of this portion of my invention, the central portion of the ship is devoted to the storage of a variable load to be carried by the ship during its fishing operations, it being understood that because the variable load is at the center of the ship or amidships, it will not disturb the balanced relationship between the bow and the stern.

A further feature of the invention relates to the structure and arrangement of the ship whereby the fish are handled initially with parts of the fish being automatically conveyed to the fish processing machinery or the fish by-product machinery, as it may be called. A still further feature of this portion of my invention resides in the utilization of sealing means for sealing the automatic conveying mechanism from the remainder of the ship, and with this sealing mechanism preferably arranged so that the conveying mechanism is accessible and may readily be cleaned.

A further feature of my invention resides in the construction and installation of an additional type of conveyor between the storage space in the center of the ship, and the fish processing machinery, so that the entire storage space may be utilized.

Still a further feature of my invention resides in the arrangement of a 'tween deck below the fishing deck for the reception of the fish and with this 'tween deck being in communication by a conveyor with the processing machinery and by conveying means to freezer and storage space.

I have thus outlined the general object and nature of my invention, and the relation thereof to the prior art, in order that my invention may be better appreciated. While the several features of the invention I have outlined are important, other features will be described in the specification that follows and will be claimed in the claims appended thereto. It should be appreciated that the basic concept of my invention may be utilized with structure considerably different from that which I shall herein describe, and that my invention and the claims covering that invention should not be limited by the specific means I have herein set forth as best embodying my invention.

Referring now to the drawings, Figs. 1 and 1a form a single view taken in section along lines 1—1 and 1a—1a respectively of Figs. 2 and 2a. Figs. 2 and 2a are sections taken respectively along lines 2—2 and 2a—2a of Figs. 1 and 1a and may be considered as one view. Fig. 3 is a section taken along line 3—3 of Fig. 2a. Fig. 4 is a section taken along line 4—4 of Fig. 2a.

Referring now more particularly to the drawings, the fishing deck of the ship is designated by reference numeral 10, and it is on this deck that the fish are brought by the utilization of fishing machinery. This fishing machinery may be of any preferred type and may embody standard trawling machinery, as for example, a winch 11. The nature of the fishing machinery is of itself not important since that machinery may change in form from time to time as developments are made. For a proper appreciation of my invention, it is merely necessary to understand that my ship is not a mother ship for mothering a series of small fishing boats, but is a large fishing ship, completely self-contained and adapted for extensive fishing operations. The preferred type of ship is 175 feet in length and 38 feet in beam.

The fish are moved from the deck 10 through a series of chutes 12 and past a series of control gates 13, for deposit on work tables 14. In my ship, I show nine such work tables, at each of which will be an experienced fish handler. This fish handler may fillet the fish or otherwise treat the fish and then deposit the fillet, or other part of the fish that is to be utilized as fish, on the traveling conveyor 15. The fish so deposited will be taken from the conveyor 15 and washed at 17 and then placed on a truck 18 for movement into the fast freeze room 19. After being frozen, the fish will be taken into the packing room 20 where they will be placed in boxes stored in space 21. The boxes are of course moved into the packing room through the door 22. If desired, it is possible to pack the fish first in boxes through utilization of the door 23 for access to packing room 20, after which the fish may be placed in the fast freeze compartment 19 for freezing within the boxes.

Regardless of the order in which the fish are frozen, once they are frozen and packed, they may be placed on suitable spiral conveyor chutes 24 for movement into the cold storage hold 25. It is interesting to note that the cold storage hold 25 is below the 'tween deck in which the fish are first handled, packed and frozen.

Those fish that are not to be frozen, as for example non-edible fish that have heretofore been merely wasted, together with the fish scrap, are directed by the operators at the tables 14 through the several chutes 30, there being one chute for each table 14. The individual chutes 30 empty into a power conveyer 31 actuated by an electric motor 32 and extending transversely of the ship as is best seen in Fig. 2. The conveyer 31 empties into a similar conveyer 33 that feeds the material in the direction of the arrow 34 lengthwise of the ship and empties it into a further conveyer 35. From the conveyer 35 the material is emptied into a hopper 36 and then into digesters 37 where the fish and scrap are digested.

The liquid from the digesters is suitably disposed of at 38 while the fish meal from the digesters is received in a large pan 39. It is taken from the pan 39 and placed in the hydraulic presses 40, where it is suitably compressed into cakes with as much of the fluid extracted therefrom as possible. The hardened cake that results is placed in a grinder or crusher 41 that crushes the fish meal and makes it available for further drying by conveyance through a series of steam jacketed conveyers 42, to which it is fed from crusher 41 by conveyer 41a. These steam jacketed conveyers 42 deliver the fish meal in practically dry condition for placing in bags 43. The use of the fish meal as animal feed and fertilizer is of course well appreciated by those skilled in the art.

The bags 43 are intended to be stored within the variable and dry storage space 44. This dry storage space 44 is separated from the processing machinery in compartment 45 by a bulkhead 46. It is separated from the 'tween deck and cold storage hold 25 by a further bulkhead 47. The conveyers 33 and 31 are suitably sealed from the dry storage space 44 by structural walls 50 and 51. It is the function of these walls to seal the conveyers 31 and 33 from the dry storage space 44, and for this purpose the walls may be of any suitable material and may take any desired shape; as for example, they may be tubular if that is deemed satisfactory. The specific nature of the fabrication is not here important. It is important, however, that sufficient space remain between the conveyers and the sealing means so that a man may enter to service and clean the conveyors.

For bringing the bags 43 of fish meal into the dry storage space 44, there is provided a conveyor designated generally by reference numeral 52. This conveyor utilizes a series of load carriers 53 suitably pivoted to a continuous chain 54 driven by a motor 55. The bulkhead 46 is formed with a suitably controlled opening 56 at its upper end and a similar opening 57 at its lower end for the passage of the load carriers 53 and the bags 43 thereon. It is obvious that conveyor 52 makes it possible to store the bags 43 at all levels within the dry storage space 44 for removal through the hatch 58 when the ship reaches dock.

At this point, it may be well to indicate that the fish are readily removable through the hatches 60 and 61 from the cold storage chamber 25, and for this purpose, the ship is provided with the usual material handling means and booms.

Referring now back again to the chamber 45 and the fish processing machinery, it is well to appreciate that the fish processing machinery I have illustrated is merely exemplary of one particular type that may be utilized. My invention is not dependent for its novelty on the utilization of any particular type of fish processing machinery, as those skilled in the art will appreciate. As an example of additional means that may be provided within the compartment 45, reference numeral 63 indicates a glue making machine that may be utilized if desired. Reference numeral 64 refers to a steam boiler that may be provided to form the steam used in the series of steam jacketed conveyers 42 and in the digester.

At the stern of the ship there is formed a vertical and central compartment 65 within which is mounted a Diesel engine 66 forming the driving mechanism for the propulsion machinery of my ship. Through coupling mechanism 67 the Diesel engine 66 drives the screw 68. The rudder of the ship is designated by reference numeral 69 and is controlled in the usual manner from the wheel house 70. A funnel 71 is in communication with the chamber 65 for carrying the exhaust gases from the Diesel engine 66. A series of rooms 72 are formed for housing the crew of the ship, as distinguished from the men who operate the fishing mechanism and the fish processing machinery. Suitable toilet and galley facilities will be provided in certain of the rooms all in accordance with modern ship practices.

Just rearwardly of the cold storage compartment 25, and to the port and starboard sides of the Diesel engine 66 and chamber 65, there are formed rooms 73 within which are housed compressors and other apparatus 74 of the refrigerating mechanism. Because of the particular arrangement of the refrigerating mechanism, the ship is balanced against listing, as will be appreciated. The refrigerating mechanism is of course used for supplying refrigeration in the freeze and cold storage rooms.

A forecastle 75 is formed at the extreme bow end of the ship for housing and feeding those members of the crew that do the fishing and the fish processing. There is thus a clear segregation of the two types of labor employed on the ship.

From the description presented, it will now be fully appreciated that the heavy propulsion machinery for the ship, together with the refrigerating mechanism, are housed at the stern of the ship and are balanced by the relatively heavy fish processing machinery within the compartment 45 at the bow of the ship. The variable cargo space represented by the cold storage room 25 and the compartment 44 is amidships. Therefore, since the arrangement of the propulsion machinery and fish processing machinery is such that the ship is neither down at the bow nor down at the stern when the compartment 44 and the storage room 25 are empty, the filling of the compartment 44 and storage room 25 will not destroy this relationship. The ship will therefore ride with its bow and stern in proper relationship under all conditions of loading.

This continuous balance is rendered further effective by the arrangement of the accommodations for the fishing and ship personnel of the crew, as set forth.

A further review of the invention I have described will indicate how efficiently the fish are processed and the portions of fish directed toward the freezing and packing rooms on the one hand, and toward the processing machinery on the other hand. The arrangement of the conveyor for moving fish meal into compartment 44 is exceedingly important, as is the provision of the means for the removal of the fish and fish meal. The arrangement of the conveyors and the manner in which the conveyors 31 and 33 are insulated from the compartment 44 is also of extreme importance in a consideration of my invention.

I believe that the nature of my invention and the contribution thereof to the prior art will now be appreciated.

I now claim:

1. In a fishing ship of the class described, fish processing machinery fixedly positioned in the bow end of the ship, propulsion machinery fixedly positioned in the stern of the ship, refrigeration machinery in the stern of said ship, said propulsion and refrigeration machinery balancing said fish processing machinery so that said ship rides in a balanced position neither down at the bow or stern, a variable cargo and refrigeration space amidships of said ship for the fish and by products processed in said ship and by said fish processing machinery, whereby the ship will not be down at the bow or stern regardless of the weight of the variable load in said space, a 'tween deck over the variable cargo hold where fish are initially processed and forwarded to said refrigeration space, and an automatic conveyer means for conveying fish or parts thereof from said 'tween deck to said fish processing machinery.

2. In a fishing ship of the class described, fish processing machinery fixedly positioned in the bow end of the ship, propulsion machinery for said ship fixedly positioned in the stern, said propulsion machinery balancing said fish processing machinery so that said ship rides in a balanced position neither down at the bow or stern, a variable cargo hold for the fish processed by said fish processing machinery positioned amidships of said ship whereby the ship will not be down at the bow or stern regardless of the weight of the variable load deposited in said variable cargo hold, a 'tween deck above said hold where the fish are initially processed, an automatic conveyer for fish and parts thereof leading through part of said variable cargo hold from said 'tween deck to said processing machinery, and means sealing said conveyer from said hold.

3. In a fishing ship of the class described, fish processing machinery fixedly positioned in the bow end of the ship, propulsion machinery for said ship fixedly positioned in the stern, said propulsion machinery balancing said fish processing machinery so that said ship rides in a balanced position neither down at the bow or stern, a variable cargo hold for the fish processed by said fish processing machinery positioned amidships of said ship whereby the ship will not be down at the bow or stern regardless of the weight of the variable load deposited in said variable cargo hold, a 'tween deck above said hold where the fish are initially processed, an automatic conveyer leading through a part of said variable cargo hold from said 'tween deck to said processing machinery, and means sealing said conveyer from said hold while forming a passage for the servicing and cleaning of said conveyer.

4. In a fishing ship of the class described, fish processing machinery fixedly positioned in the ship, a variable cargo hold for the fish processed by said fish processing machinery, a 'tween deck where the fish are initially processed, an automatic conveyer for fish and parts thereof leading through part of said variable cargo hold from said 'tween deck to said processing machinery, and means sealing said conveyer from said hold.

5. In a fishing ship of the class described, fish processing machinery fixedly positioned in the ship, a variable cargo hold for the fish processed by said fish processing machinery, a 'tween deck above said hold where the fish are initially processed, an automatic conveyer leading through a part of said variable cargo hold from said 'tween deck to said processing machinery, and means sealing said conveyer from said hold while forming a passage for the servicing and cleaning of said conveyer.

6. In a fishing ship of the class described, fish processing machinery fixedly positioned in the bow end of the ship, propulsion machinery fixedly positioned in the stern of the ship and centrally abeam thereof, refrigeration machinery at the port and starboard sides of said propulsion machinery in balancing relation, said propulsion and refrigeration machinery balancing said fish processing machinery so that said ship rides in a balanced position neither down at the bow or stern, accommodations for the ship's crew located at the stern, accommodations for a fishing crew located at the bow, and a variable cargo and refrigeration space amidships of said ship for the fish and by products processed in said ship and by said fish processing machinery, whereby the ship will not be down at the bow or stern, regardless of the weight of the variable load in said space.

7. In a fishing ship of the class described, fishing equipment mounted on the main deck of said ship, fish processing machinery fixedly positioned in the bow end of the ship, propulsion machinery fixedly positioned in the stern of the ship, refrigeration machinery in the stern of said ship, said propulsion and refrigeration machinery balancing said fish processing machinery so that said ship rides in a balanced position neither down at the bow or stern, a variable cargo and refrigeration space amidships of said ship for the fish and by-products processed in said ship and by said fish processing machinery, whereby the ship will not be down at the bow or stern, regardless of the weight of the variable load in said space, a 'tween deck over the variable cargo hold where fish are initially processed and forwarded to said refrigeration space, and an automatic conveyer means for conveying fish or parts thereof from said 'tween deck to said fish processing machinery.

8. In a fishing ship of the class described, fishing processing machinery fixedly positioned in the bow end of the ship and balanced against listing, propulsion machinery for said ship fixedly positioned in the stern and balanced also against listing, said propulsion machinery balancing said fish processing machinery so that said ship rides in a balanced position neither down at the bow or stern, a variable cargo space for the fish and the fish products processed by said fish processing machinery positioned amidships of said ship whereby the ship will not be down at the bow or stern regardless of the weight of the variable load deposited in said variable cargo space, a bulkhead separating the variable cargo space and the fish processing machinery, and a vertical and lateral conveyer movable vertically relatively to said bulkhead in said variable cargo space, and laterally of said bulkhead in and out of said variable cargo space.

WILLIAM S. JOHNSTON.